(12) United States Patent
Kanada

(10) Patent No.: US 11,117,762 B2
(45) Date of Patent: Sep. 14, 2021

(54) IMAGE PROCESSING APPARATUS, MACHINE LEARNING DEVICE, AND IMAGE PROCESSING METHOD

(71) Applicant: SEIKO EPSON CORPORATION, Tokyo (JP)

(72) Inventor: Kentaro Kanada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/837,431

(22) Filed: Apr. 1, 2020

(65) Prior Publication Data

US 2020/0317458 A1 Oct. 8, 2020

(30) Foreign Application Priority Data

Apr. 4, 2019 (JP) .............................. JP2019-071809

(51) Int. Cl.
*B65H 5/06* (2006.01)
*H04N 1/00* (2006.01)
*G06N 20/00* (2019.01)

(52) U.S. Cl.
CPC ............... *B65H 5/06* (2013.01); *G06N 20/00* (2019.01); *H04N 1/00604* (2013.01); *H04N 1/00814* (2013.01); *H04N 1/00824* (2013.01); *B65H 2511/51* (2013.01)

(58) Field of Classification Search
CPC . H04L 43/0817; H04L 41/0853; H04L 41/28; H04L 43/16; H04L 67/10; H04L 67/36; H04L 67/42; G03G 21/1889; G03G 2215/00987; H04N 1/32609; H04N 1/3263; H04N 1/32635; H04N 1/32641; H04N 1/32651; H04N 1/32694; H04N 1/00814; H04N 1/00604; H04N 1/00824; B65H 5/06; B65H 2511/51; G06N 20/00; G06N 3/0454; G06N 3/08
USPC ........................................................ 358/1.1
See application file for complete search history.

(56) References Cited

U.S. PATENT DOCUMENTS

| 8,175,467 | B2* | 5/2012 | Shoji | ........................ H04L 67/36 |
| | | | | 399/8 |
| 2003/0173736 | A1 | 9/2003 | Yano | |
| 2010/0208307 | A1* | 8/2010 | Soda | ................... H04N 1/32694 |
| | | | | 358/437 |
| 2013/0114100 | A1* | 5/2013 | Torii | ................... H04N 1/00344 |
| | | | | 358/1.14 |
| 2013/0181390 | A1* | 7/2013 | Matsunaga | .......... G03G 15/553 |
| | | | | 271/9.01 |
| 2018/0268224 | A1* | 9/2018 | Anami | ............. G08B 13/19602 |

(Continued)

FOREIGN PATENT DOCUMENTS

| JP | 2003-261237 | 9/2003 |
| JP | 2013-145316 | 7/2013 |

(Continued)

*Primary Examiner* — Negussie Worku
(74) *Attorney, Agent, or Firm* — Workman Nydegger

(57) ABSTRACT

An image processing apparatus includes: a memory configured to store a machine-learned model produced by performing machine learning using teaching data associating image data generated by reading a document by an image reading device with device abnormality information on abnormality of the image reading device; and when the image reading device reads a document, a processor configured to obtain the device abnormality information based on generated image data and the machine-learned model.

8 Claims, 13 Drawing Sheets

(56) References Cited

U.S. PATENT DOCUMENTS

| | | | | |
|---|---|---|---|---|
| 2019/0281172 A1* | 9/2019 | Baba | ............... | H04N 1/00039 |
| 2019/0306327 A1* | 10/2019 | Matysiak | ............... | G06F 3/121 |
| 2019/0317440 A1* | 10/2019 | Shiokawa | ............... | G03G 15/6561 |
| 2019/0362262 A1* | 11/2019 | Inagi | ............... | G06F 11/0709 |
| 2020/0013158 A1* | 1/2020 | Asai | ............... | G06T 7/0002 |
| 2020/0136151 A1* | 4/2020 | Ding | ............... | H01M 4/9066 |
| 2020/0280654 A1* | 9/2020 | Achiwa | ............... | G06N 3/08 |
| 2020/0293810 A1* | 9/2020 | Kanada | ............... | G06K 9/00442 |
| 2020/0361210 A1* | 11/2020 | Sato | ............... | B41J 2/16579 |
| 2020/0393998 A1* | 12/2020 | Su | ............... | G06N 3/08 |

FOREIGN PATENT DOCUMENTS

| | | |
|---|---|---|
| JP | 2016-050061 | 4/2016 |
| JP | 2018-147080 | 9/2018 |

* cited by examiner

IMAGE PROCESSING APPARATUS, MACHINE LEARNING DEVICE, AND IMAGE PROCESSING METHOD

The present application is based on, and claims priority from JP Application Serial Number 2019-071809, filed Apr. 4, 2019, the disclosure of which is hereby incorporated by reference herein in its entirety.

BACKGROUND

1. Technical Field

The present disclosure relates to an image processing apparatus, a machine learning device, and an image processing method.

2. Related Art

To date, various methods for predicting the failure time of a device have been proposed. For example, JP-A-2003-261237 discloses a method of monitoring timing when a transported sheet reaches a sheet detection sensor and predicting the life time of a roller using a function (prediction function) that approximates the transition of the delay rate of this timing (paragraphs 0018 to 0023, and the like).

However, there is a possibility that abnormality of a device occurs due to complicated correlation of various phenomena. Accordingly, it is not easy to formulate a determination criterion for predicting the occurrence of abnormality in a device and a prediction function.

SUMMARY

An advantage of some aspects of the present disclosure is that it estimates the occurrence of abnormality in a device. According to an aspect of the present disclosure, there is provided an image processing apparatus including: a memory configured to store a machine-learned model produced by performing machine learning using teaching data associating image data generated by reading a document by an image reading device with device abnormality information on abnormality of the image reading device; and when the image reading device reads a document, a processor configured to obtain the device abnormality information based on generated image data and the machine-learned model.

With this configuration, it is possible to obtain device abnormality information of an image reading device based on image data generated by reading a document and to estimate the occurrence of abnormality in the device based on the device abnormality information. Device abnormality information is information on abnormality that has occurred in the image reading device. The abnormality may include abnormality that is currently revealed, abnormality that is not revealed, but is possible to be revealed in the future, abnormality that needs human actions, and abnormality capable of being handled in the device. Also, with this configuration, the occurrence of abnormality in a device is estimated using a machine learning model, and thus it is not necessary for a person to determine a criterion for estimating the occurrence of abnormality in a device.

Further, in the above-described an image processing apparatus, in the teaching data, at least one of use history of the image reading device, reading resolution of a document, and a type of document medium may be associated with the device abnormality information.

In addition to image data, by further including information on use history, reading resolution, the type of medium in teaching data, it is possible to increase the possibility of enabling estimation of the occurrence of abnormality in the image reading device with high accuracy.

Further, in the above-described image processing apparatus, the use history may include replacement history of a document transport roller, and the device abnormality information may include time when replacement of a document transport roller becomes necessary next.

With this configuration, it is possible to estimate time when replacement of a document transport roller becomes necessary next.

Further, in the above-described image processing apparatus, the device abnormality information may include a handling method for abnormality, and the handling method may include at least one of replacement of a document transport roller, cleaning of a document transport roller, and image correction of the image data generated by the reading.

With this configuration, it is possible to estimate a handling method (abnormality handling method) including at least replacement of a document transport roller, cleaning of a document transport roller, and image correction of image data using a machine-learned model.

Further, in the above-described image processing apparatus, when the device abnormality information is information on replacement of a document transport roller, the processor may inform to encourage ordering a document transport roller or automatically place an order.

When a user of the image reading device is informed to be encouraged to order a document transport roller for replacement, compared with the case when not informed, it is possible to increase the possibility of having prepared a replacement roller at the time of the occurrence of a failure (when it becomes not possible to transport). Also, when a document transport roller is automatically ordered, it is possible to reduce time and effort of a user.

Further, in the above-described image processing apparatus, the device abnormality information may include an abnormal place of the image reading device.

With this configuration, it is possible to estimate an abnormal place of an image reading device using a machine-learned model.

According to another aspect of the present disclosure, there is provided a machine learning device including: a controller configured to obtain teaching data associating image data generated by reading a document by an image reading device with device abnormality information on abnormality of the image reading device, and perform machine learning on a model configured to input the image data and output the device abnormality information based on the teaching data.

With this configuration, it is possible to produce a machine learning model for estimating the device abnormality information of an image reading device based on image data generated by reading a document by an image reading device.

According to another aspect of the present disclosure, there is provided an image processing method including: storing a machine-learned model obtained by performing machine learning using teaching data associating image data generated by reading a document by an image reading device with device abnormality information on abnormality of the image reading device, and when the image reading device reads a document, obtaining the device abnormality information based on generated image data and the machine-learned model.

With this method, it is possible to obtain device abnormality information of an image reading device based on the image data produced by reading a document by an image reading device, and to estimate the occurrence of abnormality in a device based on device abnormality information. Also, in this method, the occurrence of abnormality in a device is estimated using a machine learning model, and thus it is not necessary for a person to determine a criterion for estimating the occurrence of abnormality in a device.

DESCRIPTION OF EXEMPLARY EMBODIMENTS

Figure 1:
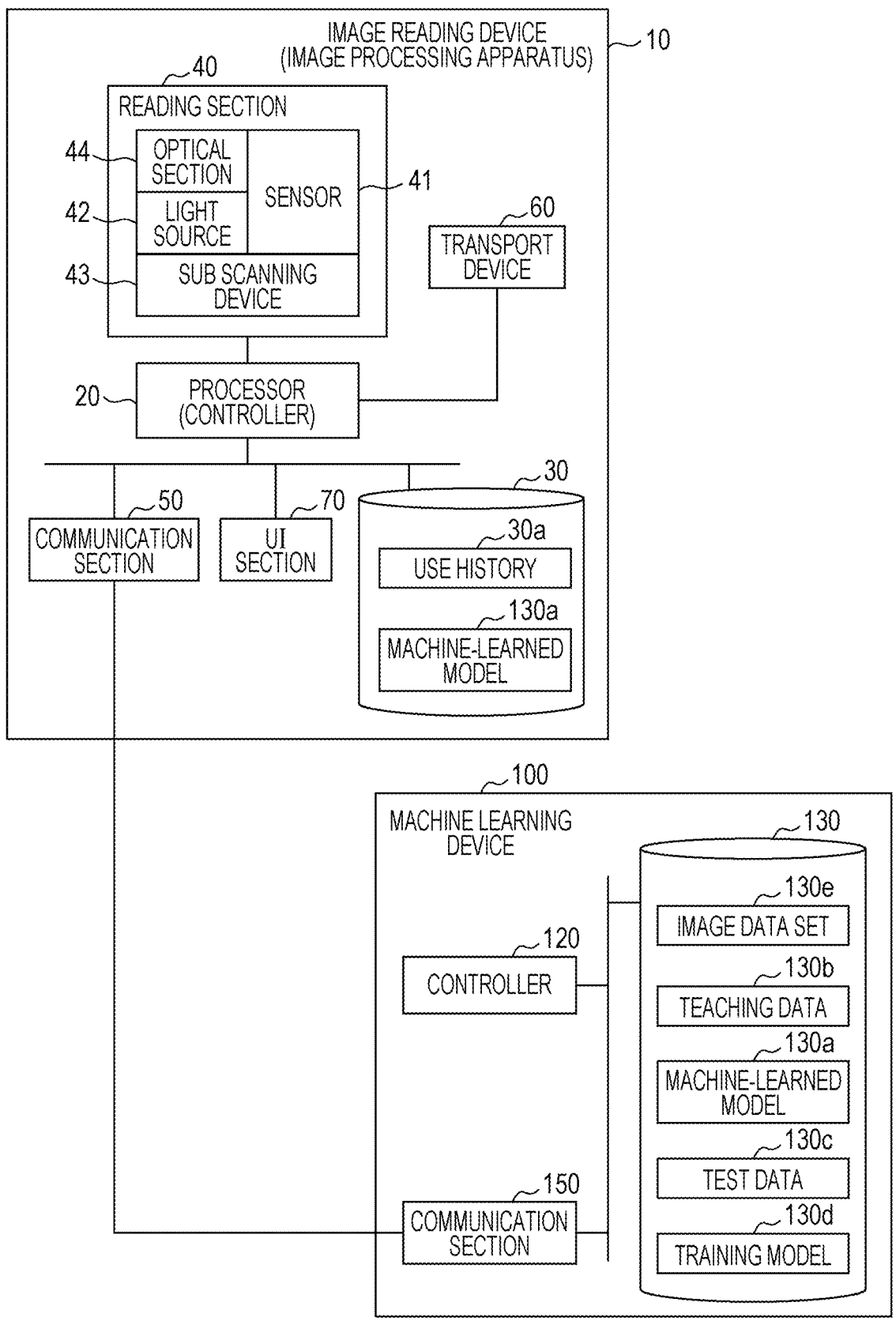
FIG. 1 is a block diagram illustrating the configuration of an image reading device and a machine learning device.

Here, a description will be given of embodiments of the present disclosure in the following order.
1. First Embodiment
 1.1 Configuration of Image Reading Device and Machine Learning Device
 1.2 Generation of Teaching Data
 1.3 Machine Learning
 1.4 Estimation of Replacement Time
2. Second Embodiment
3. The Other Embodiments 1. First Embodiment 1.1 Configuration of Image Reading Device and Machine Learning Device FIG. 1 is a block diagram illustrating the configuration of an image reading device 10 and a machine learning device 100 according to an embodiment of the present disclosure. In the present embodiment, the image reading device 10 also functions as an image processing apparatus. The image reading device 10 includes a processor 20 (corresponds to a controller of the image processing apparatus) and a nonvolatile memory 30 (corresponds to a memory). It is possible for the image reading device 10 to execute various programs recorded in the nonvolatile memory 30 by the processor 20.

Also, the image reading device 10 includes a reading section 40, a communication section 50, a transport device 60, a UI (user interface) section 70, and a clock section not illustrated in FIG. 1. It is possible for the processor 20 to obtain current date and time from the clock section.

The communication section 50 includes various removable memories mounted on the image reading device 10 and a communication interface circuit for communicating with the other devices connected to the image reading device 10 in a wired or wireless manner in accordance with various communication protocols. It is possible for the processor 20 to communicate with a machine learning device 100 described later and the other devices not illustrated in FIG. 1 via the communication section 50. Also, it is possible for the processor 20 to output image data representing the read document (image data generated by reading a document) to a removable memory, the machine learning device 100, and the other devices that are connected via the communication section 50.

The UI section 70 includes a touch panel display, various keys and switches, and the like. It is possible for the processor 20 to obtain the operation contents of a user via the UI section 70. Also, it is possible for the processor 20 to display various kinds of information on the display of the UI section 70 and inform the user of the information.

Figure 2:
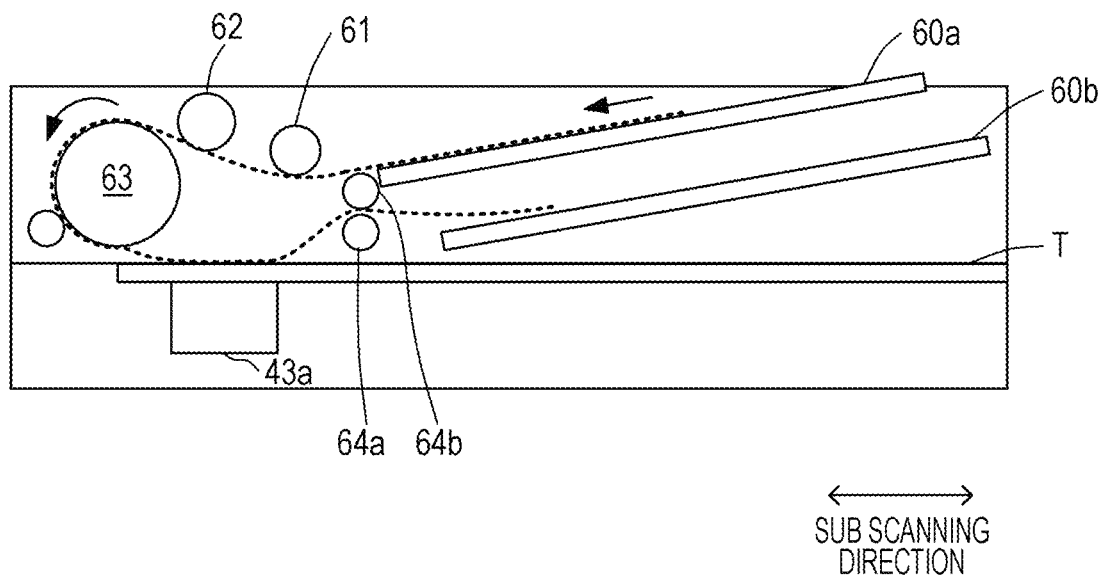
FIG. 2 is a schematic diagram illustrating an example of the configuration of a reading section.

The image reading device 10 according to the present embodiment includes an ADF (auto document feeder) and a document table, and reads a document by a selected one of the methods. The reading section 40 includes a sensor 41, a light source 42, a sub scanning device 43, and an optical section 44. FIG. 2 is a schematic diagram illustrating the configuration of the reading section 40. The sub scanning device 43 is a device capable of reciprocally moving a carriage 43a that contains the sensor 41, the light source 42, and an optical section 44 in the sub scanning direction. When the transported document is read by the ADF, the sub scanning device 43 disposes the carriage 43a at a predetermined position (ADF document reading position, refer to FIG. 2) at the time of reading an ADF document. A document transported on the document table T by the transport device 60 is read in a state in which the carriage 43a is stopped at the ADF document reading position. In this regard, a document mounted on the document table T is read in the process in which the carriage 43a moves in the sub scanning direction.

The sensor 41 includes a line sensor. The line sensor is a sensor extending in one direction and includes a plurality of photoelectric conversion elements arranged in the one direction. In the present embodiment, the line sensor is disposed such that the line sensor extending direction is perpendicular to the sub scanning direction (the transport direction of a document in the case of ADF). The direction in which the line sensor is extending is referred to as a main scanning direction. The photoelectric conversion element is an element that outputs a signal in accordance with the intensity of the received light.

The light source 42 includes a lamp that radiates light on a document. The light reflected from a document located at an irradiation position is received by the line sensor included in the sensor 41, and the line sensor generates a signal in accordance with the light reception amount by each photoelectric conversion element. The sensor 41 includes an analog front end not illustrated in the figure. The analog front end includes a circuit that applies gain to a sign output by the photoelectric conversion element in accordance with the light reception amount and outputs the signal, and an A/D conversion circuit.

The optical section 44 includes an optical component that forms a light path guiding the light from the document, which is caused by the radiating light of the light source 42 on a document, to the line sensor. The light path may be provided to have various structures, and it is possible to configure the optical component by various materials.

The transport device 60 is a mechanism that transports a document. The transport device 60 is a mechanism that transports a document set on a document tray 60*a* to the ADF document reading position, and further transports the document to a discharge tray 60*b*. A transport path is a document path formed by a resin material not illustrated in the figure. The document is kept in touch with document transport rollers at a plurality of positions on the path and is moved on the path by rotation of the rollers. In FIG. 2, the transport path is denoted by a broken line.

In the present embodiment, a feed roller 61, a separation roller 62, a reverse roller 63, and a discharge roller pair 64*a* and 64*b* are disposed as document transport rollers in order from upstream to downstream on the transport path. These document transport rollers are configured to be rotated by receiving power from corresponding motors not illustrated in the figure. The motors transmit power to the respective rollers via a power transmission mechanism not illustrated in the figure.

The surface of the rollers are formed by a high friction material, such as rubber, or the like. When the rubber is worn out, the outer diameter of the roller becomes small. Accordingly, when the roller is rotated at the same rotational speed, compared with the roller of before having been worn out, the roller having a smaller diameter due to abrasion has a short distance for transporting a document. As reading conditions of a document, two reading methods are provided. One of the methods is document-size automatic reading, in which a document size is automatically detected, and reading is performed. The other of the methods is fixed-format size reading in which a user selects the document size from any one of fixed-format sizes, and reading is performed with the selected size. In the case of document-size automatic reading, the processor 20 detects individual edges of a document in the sub scanning direction and the main scanning direction, performs trimming at the ends, and generates image data representing the document as image data (a) of document-size automatic reading and image data (b) of machine learning described later. On the other hand, in the case of fixed-format size reading, when the processor 20 completes reading of the number of pixels (depends on a reading resolution) in the sub scanning direction corresponding to the fixed-format size from detection of the start edge of the document in the sub scanning direction, the processor 20 generates image data of the number of pixels corresponding to the fixed-format size as image data (a) of fixed-format size reading. In this regard, when a document is read by fixed-format size reading, in the present embodiment, for calculating a length variation value described later, even when reading of the number of pixels (depends on a reading resolution) of fixed-format size in the sub scanning direction is completed, reading is continued until the edge of the document is detected in a case in which the edge in the sub scanning direction is not detected. When the processor 20 then detects the edge of the document in the sub scanning direction, the processor 20 generates the image data from the start edge of the document in the sub scanning direction to the end edge as image data (b) for machine learning described later. The image data (a) is image data to be provided to a user as a result of reading, and the image data (b) is image data for use in machine learning. In the case of document-size automatic reading, (a) and (b) are the same data. In the case of fixed-format size reading, as described later, when the image is not extended, (a) and (b) are the same data, whereas when the image is extended, (b) differs from (a).

When a document is read in a state in which at least any one of the document transport rollers is worn out, the aspect ratio of the image data representing the document is changed compared with the case of the image data read in a normal state of the document transport rollers. That is to say, the number of pixels in the main scanning direction is not affected by the state of the rollers. However, the number of pixels in the sub scanning direction increases compared with the case in which the rollers are normal, and thus the aspect ratio changes.

The number of pixels in the sub scanning direction increases as the roller gets worn out, that is to say, as the outer diameter becomes smaller. The image data of a document read in the state in which the roller is worn out becomes an image that has been extended in the transport direction as a whole. Also, when the roller further gets worn out, the roller completely idles over time and falls in a state incapable of transporting a document. In such a state, it is necessary to replace the roller. In this regard, a roller sometimes slips temporarily by the influence of paper powder having adhered to a part to the roller. As a result, a part of the image data in the sub scanning direction sometimes extends. In this case, the number of pixels in the sub scanning direction increases compared with the case in which the roller has not slipped. However, when a roller slips temporarily, there is a possibility that the problem is resolved by cleaning the roller without replacing the roller.

In the present embodiment, when the processor 20 reads a document, the processor 20 transmits various kind of information including the image data (for machine learning (b)) generated as a result of reading to the machine learning device 100 via the communication section 50. Also, when the processor 20 obtains a machine-learned model 130*a* generated as a result of machine learning in the machine learning device 100 from the machine learning device 100 via the communication section 50, the processor 20 stores the machine-learned model 130*a* in the nonvolatile memory 30. When the processor 20 reads a document thereafter, the processor 20 next estimates time when it becomes necessary to replace a document transport roller (replacement time) using the machine-learned model 130*a*. In the present embodiment, the device abnormality information is the next replacement time of a document transport roller. In the present embodiment, the replacement time is represented by a time length (the number of days) from the date and time of a reference to the date and time when it becomes necessary to make replacement. In the present embodiment, when the replacement time becomes shorter than a threshold value, ordering a document transport roller for replacement is encouraged.

The machine learning device 100 is a computer that generates and stores teaching data based on the information obtained from the image reading device 10, performs machine learning based on the stored teaching data, and outputs the obtained machine-learned model 130*a* as a result to the image reading device 10. In this regard, the machine learning device 100 may generate teaching data, for example, based on information obtained from a plurality of image reading devices of the same type, and may distribute the machine-learned model 130a generated as a result of the machine learning using the teaching data to the plurality of image reading devices of the same type.

The machine learning device 100 includes a controller 120 including a CPU, a RAM, a ROM, and the like, a recording medium 130, and a communication section 150. Of course, a GPU or various processors designed for machine learning may be used for the machine learning. It is possible for the controller 120 to perform the functions related to the machine learning by executing a machine learning program, not illustrated in the figure, recorded in the recording medium 130.

In the present embodiment, when the machine learning device 100 produces a machine learning model for estimating replacement time of a document transport roller of the image reading device 10, the image reading device 10 reads a document, and transmits use history 30a of the image reading device 10 traced back from the reading of this time, the image data (for machine learning) representing a document read by the image reading device 10, a document image data set including the reading parameters of the this time document, the read date and time of this time document, and the device ID of the image reading device 10 to the machine learning device 100. The machine learning device 100 generates teaching data based on the document image data set, the device ID, and the read date and time, and stores them (teaching data 130b).

1.2 Generation of Teaching Data

In the present embodiment, the next replacement time of a document transport roller is estimated using a machine learning model. It is thought that an increase in the number of pixels in the sub scanning direction from that at normal reading time occurs in the case in which a roller is worn out and the outer diameter thereof becomes smaller, and in the case in which slipping occurs temporarily due to paper powder, or the like, or both of the cases. In the present embodiment, learning is performed on the characteristic that appears in the image data representing a document when a roller is worn out, and thus the outer diameter becomes small, the characteristic of use history of the image reading device up to replacement of a roller, and the like. In the present embodiment, in order for the machine learning device 100 described later to generate a machine learning model for estimating replacement time of a document transport roller, every time the image reading device 10 reads one page of a document, the device ID of the image reading device 10 that has read a document, the read date and time of the document, image data (for machine learning) representing the read document, the reading parameters of the document, and use history of the image reading device 10 are transmitted to the machine learning device 100. Image data, reading parameters, and use history are referred to as a document image data set.

The processor 20 of the image reading device 10 obtains the current date and time at the time of reading a document from the clock section and determines it as read date and time. The document reading parameters include information on reading resolution, color/monochrome, document-size automatic reading/fixed-format size reading (including specification of the document direction), length variation value, type of document medium, single-sided scanning/front face of double-sided scanning/back face of double-sided scanning, and the like.

In the present embodiment, a machine learning model described later is separately configured by setting of color/monochrome, and reading resolution. Accordingly, color/monochrome setting value and reading resolution are used for selecting a machine learning model to be targeted. The document-size automatic reading is a reading method that detects the edges of a document, trims the image at the edges, and generates image data representing the document. The fixed-format size reading is a reading method in which a user specifies the size and the direction of a document, such as A4 vertical, A4 horizontal, or the like, the document is read in the size and the direction in accordance with the specification contents by the user, and image data representing the document is generated. In this regard, when it is detected that the size and the direction of a document that are specified by a user differs greatly from a predetermined reference, the user may be prompted to reconfirm the size and the direction.

A length variation value ought to represent a variation (difference) of a length (the number of pixels R1) of the document actually read in the sub scanning direction using the length (the number of pixels R) of the document in the sub scanning direction when it is assumed that a document transport roller has read the document in a normal state as a reference. For example, the length variation value may be defined as $R1-R$, $R1/R$, $(R1-R)/R$, or the like.

Figure 3:
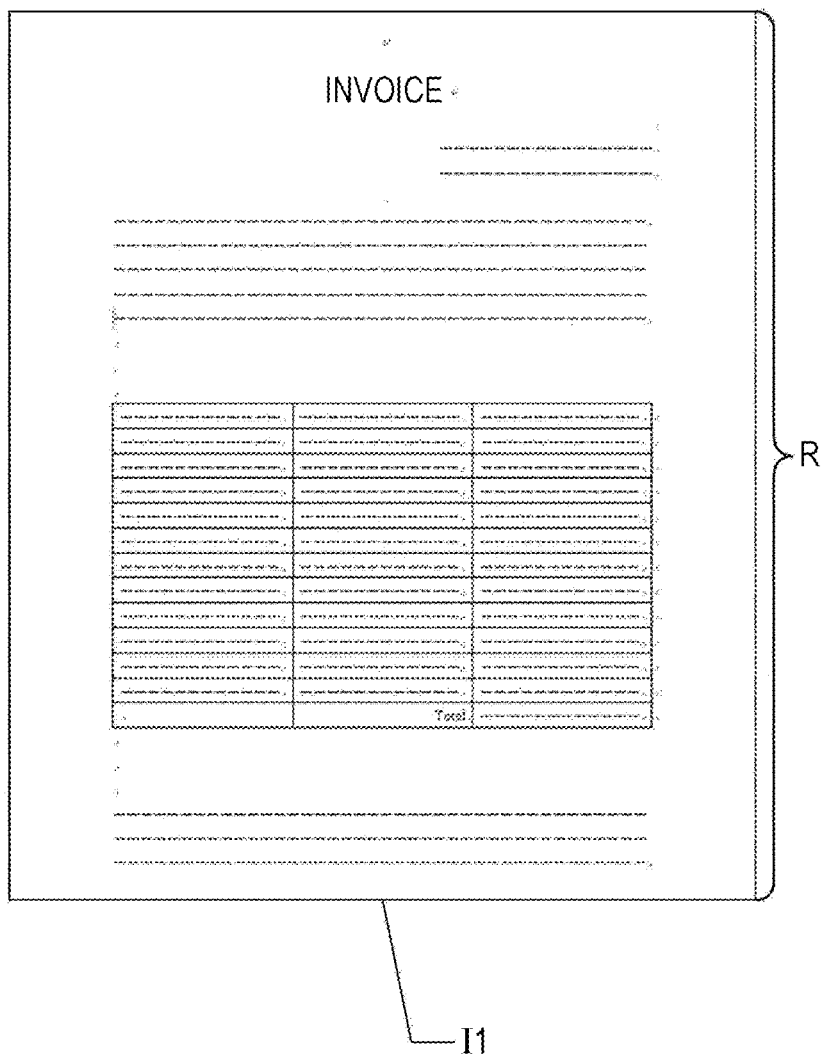
FIG. 3 is a diagram illustrating an example of an image generated by reading a document.
Figure 4:
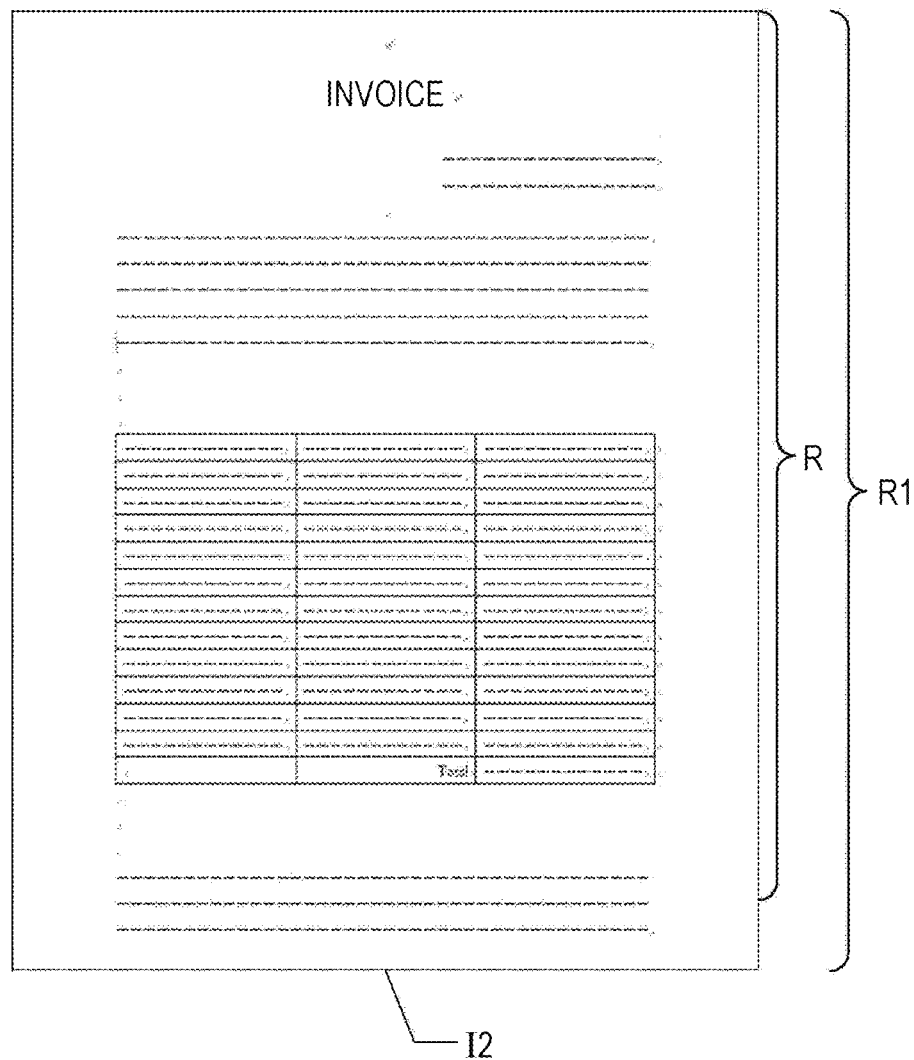
FIG. 4 is a diagram illustrating an example of an image generated by reading a document.

In the case of fixed-format size reading, in the present embodiment, a length variation value is calculated based on the number of pixels (R) in the sub scanning direction in accordance with the reading resolution and the fixed-format size (including the document direction) that are selected by a user and the actual number of pixels (R1) of the document in the sub scanning direction. An image I1 in FIG. 3 illustrates an example of an image of a document (invoice in this example) that is read when a roller is not worn out. An image I2 in FIG. 4 illustrates an example of an image of a document that is read when a roller is worn out. As illustrated by the image I2 in FIG. 4, when a roller is worn out, the number of pixels in the sub scanning direction becomes a higher value R1 than the value R in accordance with the selection by the user.

In the case of document-size automatic reading, in the present embodiment, a determination is made as to whether or not a document has the same format as a known format. In the case of the same format as a known format, a length variation value is calculated based on the number of pixels (R) in the direction corresponding to the sub scanning direction in a known format in accordance with the reading resolution and the number of pixels (R1) of the document in the sub scanning direction. When a roller is worn out, as illustrated by the image I2 in FIG. 4, the number of pixels in the sub scanning direction becomes the value R1 higher than the value R based on the known format, or the like.

A known format may be assumed to be, for example, a specific company invoice, a specific store receipt, and a document having a specific configuration, wording, and logo, and the like. Whether a known format or not may be determined, for example, using a machine learning model for determining a known format. When image data is input, in the case in which the image data corresponds to any one of known formats F1 to Fn, a machine-learned model produced by machine learning so as to output the corresponding one of the formats may be used. The machine-learned model may be periodically relearned, and the type of known format may be increased. When an output is obtained that the input image data corresponds to any one of the formats, it is possible to obtain the number of pixels (R) of the document in the sub scanning direction when a roller is normal in accordance with the reading resolution and the document direction corresponding to the format. In this regard, in the case of document-size automatic reading, when image data representing a document does not correspond to a known format, in the present embodiment, whether or not there is a length variation in the sub scanning direction is handled to be unknown.

The type of document medium may be input, for example, by a user. Specifically, for example, after the processor 20 sets a document on the document tray 60*a*, the processor 20 obtains the type of document input by the user via the UI section 70 before giving an instruction to start image reading. A type of medium may be selected from paper having different rigidity and weight (weight per unit area), for example, plain paper, thin paper, and thick paper. Also, for example, the type of medium may be selected from paper having different surface gloss and smoothness, for example, coated paper, uncoated paper, embossed paper, and the like. The easiness of paper powder to adhere to a roller and the easiness of abrasion of a roller may differ depending on the type of medium.

In this regard, the type of document medium may be determined by detecting the characteristic which is different in accordance with the type of medium by a sensor. For example, the image of paper fiber irregularities may be obtained based on the image data produced by reading the surface of a document by a sensor, or the type of document medium may be automatically determined based on the roughness of fiber arrangement, and the like. The sensor may be realized by the sensor 41 or by a sensor other than the sensor 41. Also, in the transport path, the transmittance of a document may be obtained, and the type of medium may be determined based on the transmittance. A transmittance tends to decrease as weight increases. Also, for example, the weight of a document may be detected using an ultrasonic wave sensor, or the like.

Single-sided scanning/double-sided scanning is specified by a user. When both-sided scanning is specified, the processor 20 associates whether a document corresponds to a front face or a back face out of both-sided scanning and determines it as one of data in the reading parameters. In this regard, in the case of both-sided scanning, a part of a document that has been transported via the feed roller 61, the separation roller 62, the reverse roller 63, and the discharge roller pair 64*a* and 64*b* and is discharged on the discharge tray 60*b* is drawn back by reverse rotation of the discharge roller pair 64*a* and 64*b*, and the like. The drawn back document is reversed by the reverse roller 63, and the back face of the document is read, and the document is discharged on the discharge tray 60*b* by forward rotation of the discharge roller pair 64*a* and 64*b*. That is to say, a part of the document transport rollers has a rotation direction of the forward rotation, but a part of the document transport rollers is capable of both the forward rotation and the reverse rotation.

The use history 30*a* of the image reading device 10 includes the replacement history of a document transport roller. The replacement history of a document transport roller includes information indicating the use start date and time of the document transport roller that are currently attached. Also, the replacement history of a document transport roller may include the date and time, the frequency, and the like when a document transport roller was replaced from the start of using the image reading device 10.

Also, the use history 30*a* of the image reading device 10 includes transport error history (error contents and the number of occurrences, or error contents and the occurrence date and time), such as paper jam, and the like that have occurred from the use start date and time or later of the document transport roller currently attached and maintenance history (maintenance contents and the number of executions, or maintenance contents and the execution date and time), such as roller cleaning, and the like for resolving a transport error. Also, the use history 30*a* includes the accumulation value of transport distances from the use start date and time of a document transport roller currently attached. A transport distance is calculated based on the number of rotations of each roller. For a roller capable of both forward rotation and reverse rotation, the transport distance in the forward direction and the transport distance in the backward direction may be calculated.

Also, the use history 30*a* includes the history (read date and time and reading parameters) of the reading parameters of the document reading performed from the use start date and time or later of a document transport roller currently attached and having the most recent maximum specified number of pages (for example, ten thousand pages). Accordingly, the use history 30*a* includes information (transition information of length variation value) indicating the transition of most recent length variation value. Accordingly, there is a possibility that it is possible to determine whether extension is due to a temporary slip or extension is caused by abrasion of a roller. Also, the use history 30*a* includes information correlated with the reading frequency of documents in the image reading device 10 and the operating rate.

Figure 5:
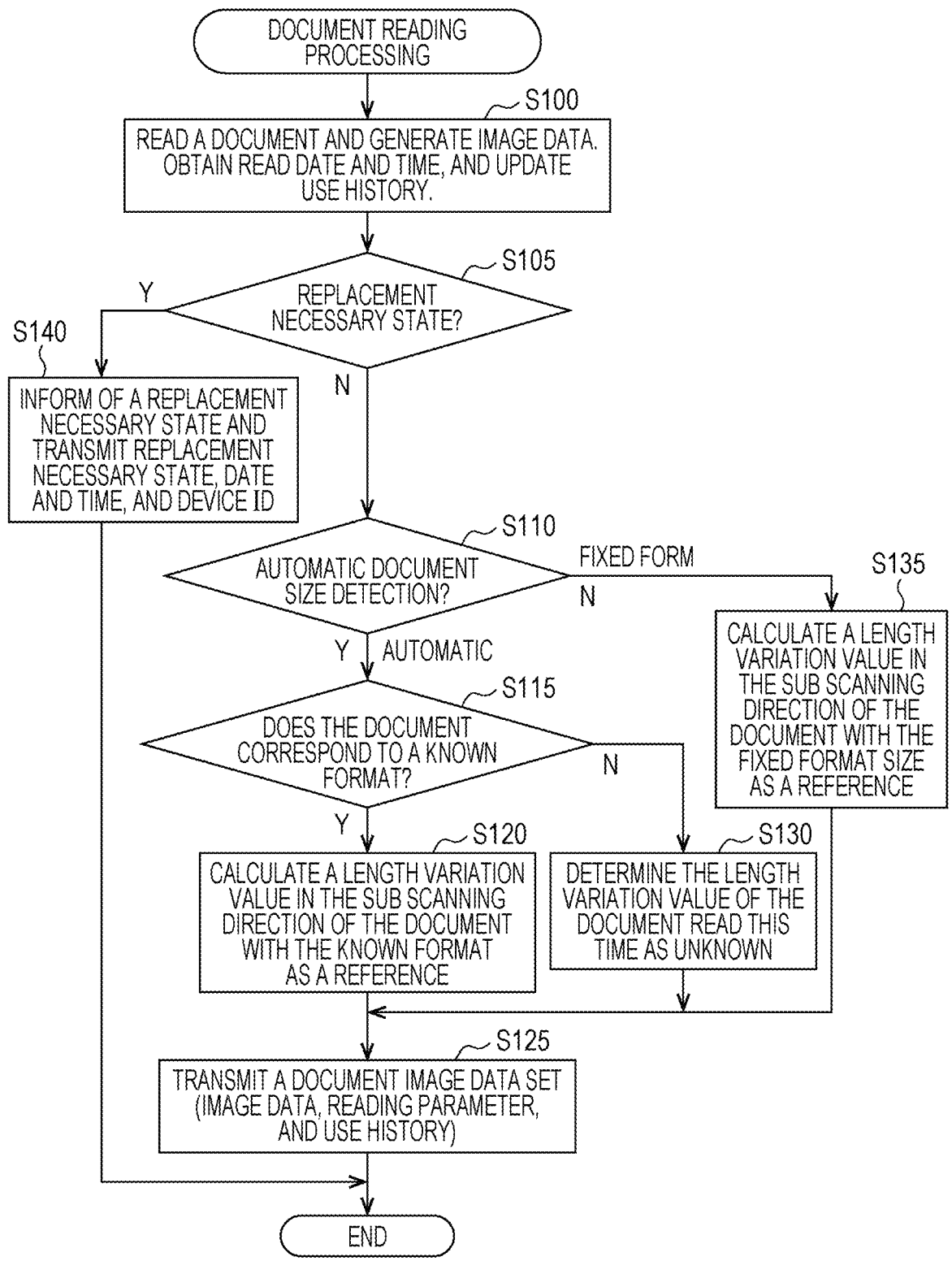
FIG. 5 is a flowchart of document reading processing.

FIG. 5 is a flowchart of the document reading processing executed by the processor 20 of the image reading device 10 in the case of generating teaching data. The document reading processing in FIG. 5 is performed for each one page of the document when a user sets a document on the document tray 60*a*, specifies the reading conditions (reading resolution, color/monochrome, document size automatic/fixed-format size (including specification of direction), the type of medium, single-sided scanning/double-sided scanning, and the like) via the UI section 70 and inputs a reading start instruction.

When the document reading processing in FIG. 5 is started, the processor 20 reads a document and generates image data representing the document (step S100). That is to say, the processor 20 controls the transport device 60 in the state in which the carriage 43*a* is disposed at the ADF document reading position, transports the document by the rotation of the document transport roller, turning on the document light source 42, reads the document by the sensor 41, and generates image data. Also, at this time, the processor 20 obtains read date and time from the clock section. Also, the processor 20 updates the use history 30*a*.

Next, the processor 20 determines whether or not a document transport roller is in a replacement necessary state (step S105). The conditions for determining that replacement of a document transport roller is necessary are determined in advance, and a determination is made as to whether the conditions are met. For example, a state in which transport errors, such as a paper jam, and the like occur repeatedly a predetermined times even when maintenance, such as cleaning of a roller, or the like is performed may be handled as a replacement necessary state of a document transport roller. In this regard, when a transport error, such as a paper jam, or the like occurs in the process of reading in step S100, that state is a state in which transport and reading in S100 have not been completed.

In step S105, when it is not determined as a replacement necessary state, the processor 20 determines whether or not the document is read with document size automatic detection (step S110). That is to say, as one of the reading conditions, the processor 20 determines whether a user has specified "document-size automatic reading" in which a document size is automatically detected or "fixed-format size reading" in which reading is performed with fixed-format size.

In step S110, when determined that the document has been read with document size automatic reading, the processor 20 determines whether or not the document corresponds to a known format (step S115). The processor 20 inputs the image data generated in step S100 in a model for estimating whether or not the image data corresponds to the above-described known format and obtains output. When the image data corresponds to a known format, the processor 20 obtains the number of pixels from one paper edge to the other paper edge in the main scanning direction and the number of pixels from one paper edge to the other paper edge in the sub scanning direction when the processor 20 reads a document in the known format with the same reading resolution as this time and with the same direction (the vertical direction of the document is the sub scanning direction or the horizontal direction of the document is the sub scanning direction).

When it is determined that the document corresponds to a known format in step S115, the processor 20 calculates the length variation value of the document in the sub scanning direction with the known format as a reference (step S120). As described above, the processor 20 obtains {(R1−R)/R}, or the like as a length variation value. In this regard, the length variation value is handled as one piece of information on the reading parameters.

When it is not determined that the document corresponds to a known format in step S115, the processor 20 determines that the length variation value of the document read this time as unknown (step S130). When the document has not been read with document-size automatic reading in step S110, that is to say, in the case of a fixed-format size reading, the processor 20 calculates a length variation value (for example, (R1−R)/R) of the document in the sub scanning direction with the fixed-format size as a reference (step S135). In this regard, when the size and the direction specified by the user differ from those of the document read this time equally or greatly than a predetermined reference, the processor 20 may handle the length variation value of the document read this time as unknown in step S135.

After the processing in step S120, or step S130, or step S135 is executed, the processor 20 associates the document image data set with the read date and time and the device ID of the image reading device 10, transmits them to the machine learning device 100 via the communication section 50 (step S125), and terminates the document reading processing.

In step S105, when determined to be in a replacement necessary state, the processor 20 informs the user of being in a replacement necessary state, further transmits being in the replacement necessary state, the date and time when falling into a replacement necessary state, and the device ID of the image reading device 10 to the machine learning device 100 (step S140), and terminates the document reading processing. For example, the processor 20 displays the replacement procedure of a document transport roller on the display of the UI section 70. In this regard, when a transport error occurs, or maintenance is performed, the processor 20 updates the corresponding data in the use history 30a.

As described above, when the processor 20 reads a document for one page, the processor 20 associates the document image data set (image data, reading parameters, and use history) with a combination of the device ID and the read date and time and transmits them to the machine learning device 100. That is to say, in the image reading device 10, until when it becomes necessary to replace a document transport roller, the processor 20 sequentially transmits the document image data set, the read date and time, and the device ID to the machine learning device 100 in accordance with document reading. Also, in the image reading device 10, when it becomes necessary to replace a document transport roller, the processor 20 transmits that state, the date and time, and the device ID to the machine learning device 100.

Figure 6:
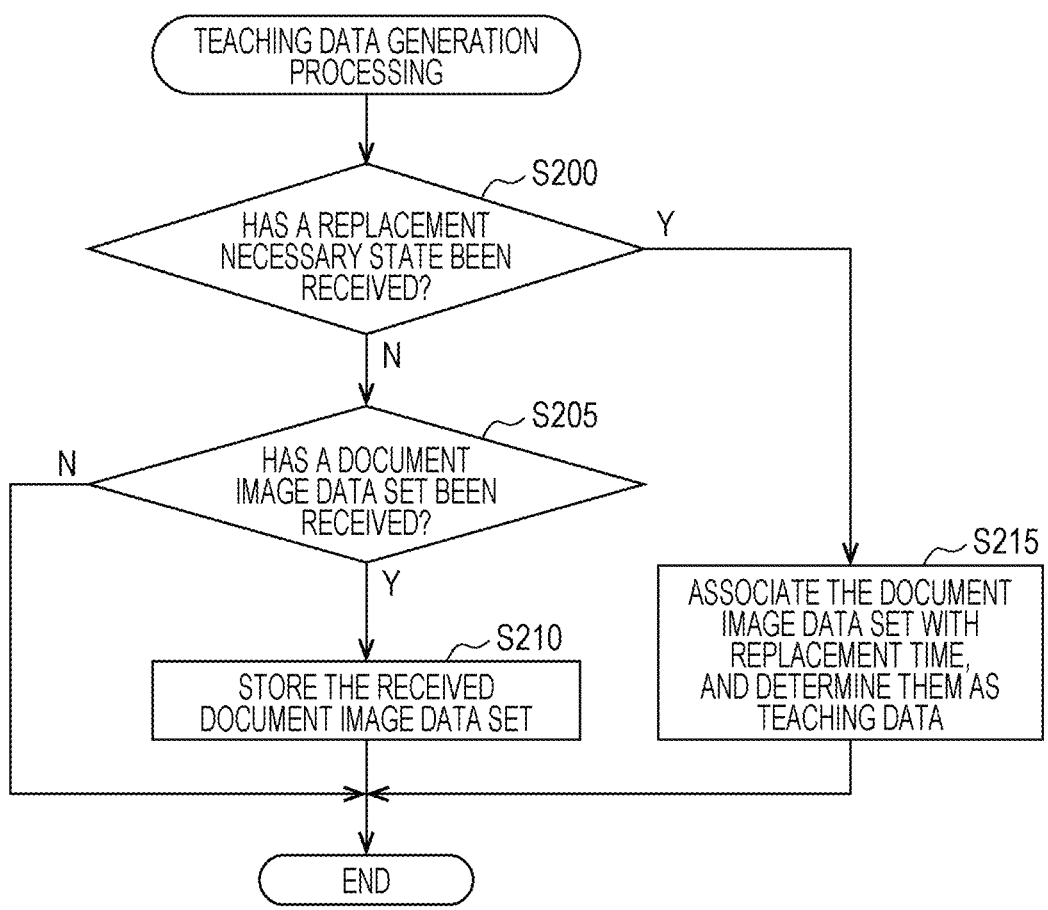
FIG. 6 is a flowchart of teaching data generation processing.

FIG. 6 is teaching data generation processing performed by the controller 120 of the machine learning device 100, and is the processing on the machine learning device 100 that corresponds to the document reading processing in FIG. 5. The teaching data generation processing is performed when the controller 120 receives data from the image reading device 10. When the teaching data generation processing is started, the controller 120 determines whether or not a replacement necessary state has been received (step S200). In step S200, when it is determined that a replacement necessary state has been received, the controller 120 determines whether or not the document image data set has been received (step S205). When it is not determined to have received the document image data set in step S205, the controller 120 terminates the teaching data generation processing. When it is determined to have received the document image data set in step S205, the controller 120 stores the received document image data set in the storage medium 130 (step S210). That is to say, the document image data set transmitted from the image reading device 10 is associated with the read date and time and the device ID in accordance with reading of a document in the image reading device 10, and is stored.

When the controller 120 determines that a replacement necessary state has been received in step S200, the controller 120 organizes teaching data that associates the document image data set with the replacement time of a document transport roller (step S215). That is to say, when the controller 120 of the machine learning device 100 receives information stating that it has become a replacement necessary state of a document transport roller, the date and time thereof, and the device ID from the image reading section 10, the controller 120 extracts a document image data set having a device ID same as the device ID of the image reading device 10 that has transmitted the replacement necessary state and that is associated with the read date and time equal to or later than the use start date of the document transport roller currently attached from the document image data sets having been stored in the storage medium 130 so far. The controller 120 calculates the difference between the read date and time associated with each of the extracted document image data sets and the date and time of becoming the replacement necessary state. In the present embodiment, the time when it becomes necessary to replace a document transport roller is expressed by this difference. That is to say, the replacement time is expressed by the remaining time until it becomes necessary to replace a document transport roller next with the document read date and time as a reference. Accordingly, for example, the replacement time is expressed such as one week later to less than two weeks, or the like. The controller 120 generates teaching data that associates the document image data set with the replacement time and adds the teaching data to the teaching data 130b.

1.3 Machine Learning

Figure 7:
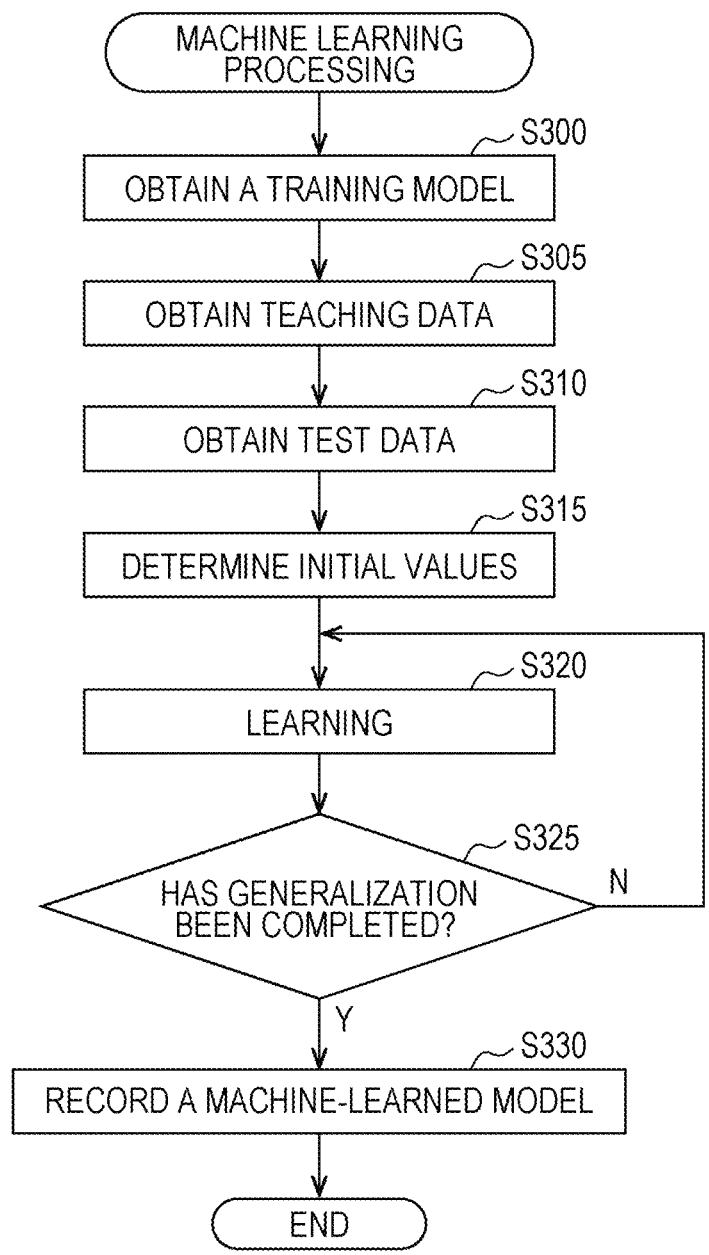
FIG. 7 is a flowchart of machine learning processing.

When a specified amount of teaching data is stored in this manner, the controller 120 performs machine learning processing using the teaching data. FIG. 7 is a flowchart illustrating the machine learning processing. The machine learning processing may be performed at any time after a specified amount of the teaching data 130b is stored. When the machine learning processing is started, the controller 120 obtains a training model 130d (step S300). Here, a model refers to information indicating an expression that derives the corresponding relationship between the data to be estimated and the data of an estimation result. In the present embodiment, as an example, a description will be given of a model in which data to be estimated is image data, document reading parameters, and use history of the image reading device that has read the document, and the time when it becomes necessary to replace a document transport roller next in the image reading device is the data of an estimation result.

Figure 8:
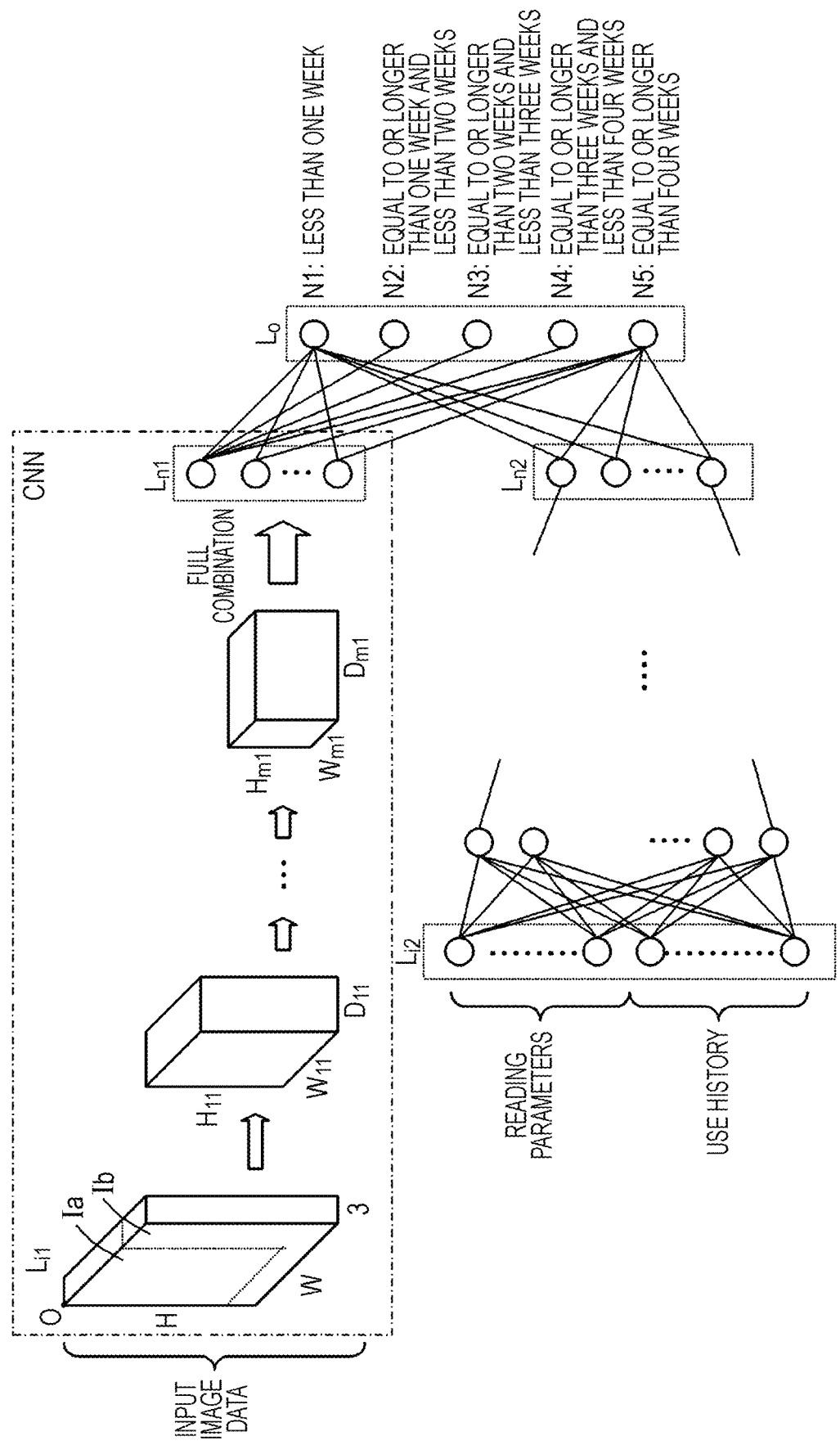
FIG. 8 is a diagram illustrating input and output of a machine learning model.

As long as a model converts input data into output data, it is possible to give various definitions to the model. FIG. 8 is a diagram schematically illustrating an example of a model used in the present embodiment. In the present embodiment, a CNN (convolutional neural network) is used for image data generated by reading a document. In FIG. 8, a change in the data format by CNN is denoted by a cuboid, and a node in a normal neural network is denoted by a white circle.

In the model illustrated in FIG. 8, the input image data generated by adding pixels such that the image data indicating a document has a specified size is used as input data to the input layer $L_{i1}$ of CNN, and intermediate output data on the image data is output from the layer $L_{n1}$. The image data input to CNN has vertical H pixels and horizontal W pixels, and the grayscale values of three channels, R: red, G: green, and B: blue, are specified for each pixel. Accordingly, in FIG. 8, the image of an input layer $L_{i1}$ is schematically illustrated image by a cuboid having values of vertical H, horizontal W, and depth 3. FIG. 8 illustrates an example in which after the image is input to the input layer, the image goes through CNN, that is to say, the image is subjected to convolution operation by a predetermined number of filters having predetermined sizes, operations by an activation function, and operation by a pooling layer, and is converted into $H_{l1} \times W_{l1} \times D_{l1}$ output values. In FIG. 8, an example is illustrated in which conversion is performed by going through a plurality of layers (omitted in FIG. 8) after this, and $H_{m1} \times W_{m1} \times D_{m1}$ output values are produced. After the $H_{m1} \times W_{m1} \times D_{m1}$ output values are obtained by CNN, output values indicating the intermediate output data on the image data are obtained in the layer $L_{n1}$ by full combination.

In this regard, in the present embodiment, a machine learning model is organized for each document reading resolution or color/monochrome setting value and a target model is selected in accordance with reading resolution, color/monochrome setting value, or the like. These machine learning models have different CNN configurations. For example, when a document is read in color, input image data is expressed by RGB three-channel grayscale values as illustrated in FIG. 8. However, in the case of monochrome, input image data is expressed by a one-channel grayscale value. Also, the number of vertical and horizontal pixels H and W of the input image data are different depending on reading resolution. In this regard, in the present embodiment, image data is input such that the sub scanning direction of the document is parallel to for example, the height (H) direction of the input image data of the CNN, and the start edge of the document in the sub scanning direction is positioned, for example, on the upper side of the input image data of the CNN. Also, it may be assumed that the number of pixels in width (W) of the input image data of the CNN is a value corresponding to the maximum value in the main scanning direction of a document capable of reading by ADF in the image reading device 10. The number of pixels in height (H) of the input image data of the CNN may be assumed to be the sum of the maximum value in the sub scanning direction of the document capable of reading by ADF in the image reading device 10 and the length variation maximum value assumed by abrasion of a roller. Also, in the present embodiment, as illustrated in FIG. 8, the controller 120 disposes the image data indicating a document, for example, such that one of the edges of the image data Ia indicating the document in the main scanning direction and the start edge in the sub scanning direction match a reference position O of the input image data of the CNN, and the remaining part Ib other than the image data Ia indicating the document is padded with NULL values, or the like so that input image data having H×W pixels is generated.

Also, the model according to the present embodiment is provided with a node for inputting reading parameters and a node for inputting use history. In the present embodiment, each data forming the reading parameters and each data forming the use history are used as input data to each node of the input layer $L_{i2}$, and intermediate output data on the reading parameters and the use history are output from the layer $L_{n2}$.

That is to say, the model illustrated in FIG. 8 is provided with a node for inputting the input image data of H×W pixels generated from the image data indicating the document read at date and time tn, nodes for inputting individual data indicating the document at date and time tn, and date, and nodes for inputting individual data indicating the history (use history) of using the image reading device at time earlier than the time tn.

Each node of the output layer $L_o$ receives the output values of each node of layers $L_{n1}$ and $L_{n2}$ as input. Each node of the output layer $L_o$ corresponds to the estimated failure time (N1, N2, N3, N4, and N5). Reference signs N1 to N5 correspond to have failure time of less than one week, one week or later to less than two weeks, two weeks or later to less than three weeks, three weeks or later to less than four weeks, and four weeks or later in this order. The output values of the individual nodes N1 to N5 of the output layer $L_o$ are normalized to be totaled 1. In this regard, multiple layers may be provided between the layers $L_{n1}$ and $L_{n2}$, and the output layer $L_o$. It is possible to estimate the failure time corresponding to a node having the highest output value in the output layer $L_o$ to be the period having a high possibility that a document transport roller of the image reading device 10 becomes necessary to be replaced with the date and time (document reading date and time) when the image data input to the input layer $L_{i1}$ as a reference.

In step S300 in the flowchart illustrated in FIG. 7, a training model is obtained. Here, training refers to a learning target. That is to say, in a training model, image data, reading parameters, and use history are input, and estimated replacement time of a document transport roller of the image reading device 10 is output. However, a corresponding relationship between a combination of image data, reading parameters, and use history and the replacement time is not correct in the initial stage. That is to say, in the training model, it is possible to determine the number of layers included in a node and the number of nodes. However, the parameters (weight, bias, and the like) that specify the input and output relationship have not been optimized. These parameters are optimized in the process of machine learning (that is to say, are trained).

A training model may be determined in advance or may be obtained by operating a UI section not illustrated in the figure coupled to the machine learning device 100 by an operator who operates the machine learning device 100. In either case, as illustrated in FIG. 8, the controller 120 obtains, as a training model, the parameters of the neural network that output the replacement time of a document transport roller of the image reading device 10 based on the image data, the reading parameters, and the use history that are obtained by the image reading section 10.

Next, the controller 120 obtains teaching data (step S305). In the present embodiment, as described in the document reading processing in FIG. 5 and the teaching data generation processing in FIG. 6, teaching data is organized and is stored in the storage medium 130. The controller 120 refers to the storage medium 130 and obtains the teaching data 130*b*. Next, the controller 120 obtains test data 130*c* (step S310). In the present embodiment, part of the teaching data 130*b* is extracted from the teaching data 130*b* to be used as test data. The test data is not used for training.

Next, the controller 120 determines initial values (step S315). That is to say, the controller 120 gives initial values of the variable parameters to the training model obtained in step S300. The initial values may be determined by various methods. For example, random values, 0, or the like may be used as initial values, and the initial values may be determined based on a different idea of a weight and a bias. Of course, initial values may be adjusted such that the parameters are optimized in the learning process.

Next, the controller 120 performs learning (step S320). That is to say, the controller 120 inputs the image data, the reading parameters, and the use history in the teaching data 130*b* obtained in the step S305 into the training model obtained by step S300 and calculates the output values of the output layer $L_o$. Also, the controller 120 identifies an error by a loss function that indicates an error between the output replacement time and the replacement time indicated by the teaching data 130*b*. The controller 120 then repeats update processing of the parameters based on the derivation of the loss function by the parameters a specified number of times. For example, consider the case in which teaching data is provided that associates a document image data set (DSn) at date and time to with "180 days later" as replacement time. The phrase "180 days later" corresponds to "four weeks or later" of node N5 of the output layer $L_o$ in the model according to the present embodiment. Accordingly, in this case, the parameters are updated so that the output (N1, N2, N3, N4, and N5) obtained by inputting the image data, the reading parameters, and the use history of the document image data set (DSn) into the model come close to (0, 0, 0, 0, and 1).

Of course, it is possible to apply various functions to the loss function. For example, it is possible to apply a cross entropy error, or the like. The processing for calculating the loss function as described above is performed on all of or a part of the image included in the teaching data 130*b*, and the loss function in one-time learning is expressed by its average or total. When the loss function in one-time learning is obtained, the controller 120 updates the parameters by a specified optimization algorithm, for example, stochastic gradient descent.

As described above, after the parameters are updated for a specified number of times, the controller 120 determines whether or not generalization of a training model has been completed (step S325). That is to say, the controller 120 obtains output indicating the setting by inputting the image data indicated by the test data obtained in step S310 into the training model. The controller 120 then obtains the matching degree of the output setting and the setting associated with the test data. In the present embodiment, when the matching degree is equal to or higher than a threshold value, the controller 120 determines that the generalization has been completed.

In this regard, in addition to the evaluation of generalization performance, the validity of hyperparameter may be verified. That is to say, in the configuration in which hyperparameters, which are the variable amounts other than weight and bias, for example, the number of nodes and the like are tuned, the controller 120 may verify the validity of the hyperparameter based on the verification data. The verification data may be extracted from the teaching data by the same processing as that in step S310. Of course, the verification data is not used for training in the same manner as the test data.

In step S325, when the controller 120 determines that the generalization of a training model has not been completed, the controller 120 repeats the processing of step S320. That is to say, the controller 120 further updates the weight and the bias. On the other hand, in step S325, when the controller 120 determines that the generalization of a training model has been completed, the controller 120 records a learned model (step S330). That is to say, the controller 120 records a training model in the recording medium 130 as the machine-learned model 130*a*.

With the configuration described above, it is possible to produce a model (machine-learned model 130*a*) for estimating roller replacement time of the image reading device 10. The controller 120 transmits the machine-learned model 130*a* to the image reading device 10 via the communication section 150. When the processor 20 of the image reading device 10 receives the machine-learned model 130*a* via the communication section 50, the processor 20 stores the machine-learned model 130*a* in the nonvolatile memory 30.

1.4 Estimation of Replacement Time

When the processor 20 of the image reading device 10 reads a document after storing the machine-learned model 130*a* in the nonvolatile memory 30, the processor 20 obtains the image data representing the document, the reading parameters, and the use history, and inputs these data in the machine-learned model 130*a*. It is possible for the processor 20 to obtain the output value of each node of the output layer $L_o$ of the machine-learned model 130*a* and to estimate replacement time based on the output value of each node.

Figure 9:
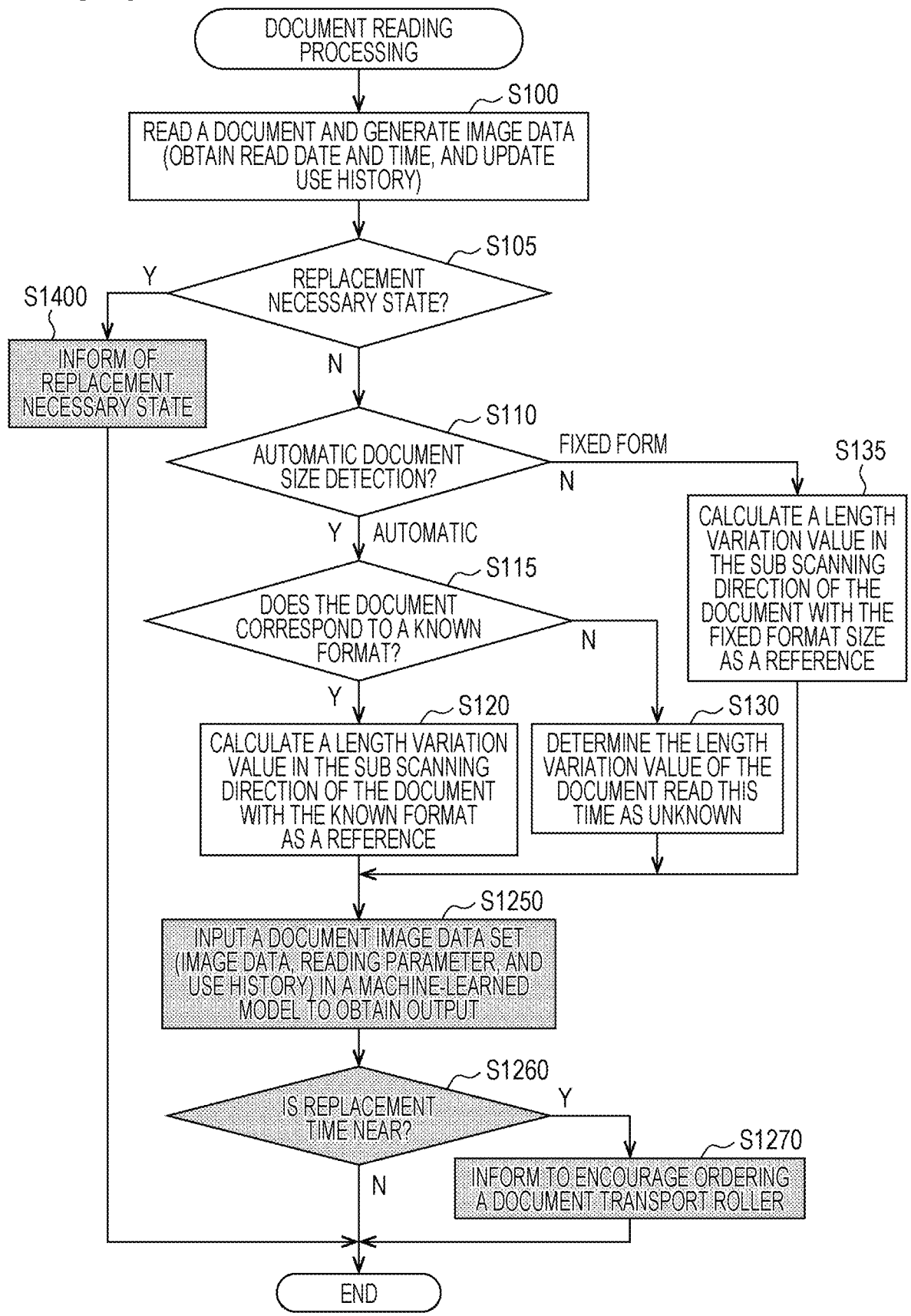
FIG. 9 is a flowchart of document reading processing.

FIG. 9 is the document reading processing performed by the image reading device 10 when a document is read after obtaining the machine-learned model 130*a* from the machine learning device 100. The processing common to the image reading processing in FIG. 5 is given the same step number as that of the step in FIG. 5, and the description thereof will be omitted. The processing colored in gray in FIG. 9 is the place that differs from the document reading processing in FIG. 5. In the document reading processing in FIG. 9, after the processing in any one of step S120, step S130, and step S135 is performed, the processor 20 inputs document image data in the machine-learned model 130*a* and obtains output (step S1250). That is to say, the controller 120 selects a model in accordance with the reading conditions, inputs each data of input image data including image data, the reading parameters, and use history in the selected model, and obtains output.

Next, the processor 20 determines whether or not replacement time is near (step S1260). When determined that replacement time is near, the processor 20 informs to encourage ordering a document transport roller (step S1270). That is to say, the processor 20 determines whether or not the replacement time is shorter than a predetermined threshold value based on the output of the machine-learned model 130*a*. When the replacement time is shorter, the processor 20 encourages the user to order a replacement roller.

For example, when the output (N1, N2, N3, N4, and N5) from the machine-learned model 130*a* are (0.07, 0.9, 0.02, 0.007, and 0.003), the processor 20 selects N2 that has the highest output value. Reference sign N2 is associated with one week or later to less than two weeks. The processor 20 estimates that replacement time is the period of one week or later to less than two weeks using the current time (the read date and time of a document at this time) as a reference.

In the present embodiment, when the estimated replacement time becomes less than a predetermined threshold value, the processor 20 informs a user of the image reading device 10 of ordering a replacement roller via the display of the UI section 70. The processor 20 may inform the user of the contents encouraging the arrangement of a serviceman who carries out maintenance work (replacement work) in addition to the contents of encouraging ordering a document transport roller.

For example, when the threshold value is 14 days, in the case in which the estimated failure time is less than two weeks, a notification is made. In this regard, for example, when a notification is made once, a notification may not be made again for a certain period of time. In this manner, it is possible not to notify of the same contents frequently so as to prevent the notification from turning into formality. Also, for example, the notification contents may differ, or the notification destination may differ depending on the case that the estimated replacement time is less than two weeks, or the case of less than one week.

In this regard, the notification destination is not limited to the UI section 70, and may be to a server computer at a support center capable of communicating with the image reading device 10 via the Internet, or the like. When the notification is made to a support center, a replacement document transport roller may be automatically ordered. In this case, it is not necessary for a user of the image reading device 10 to actively place an order of a replacement document transport roller, and thus it is possible to reduce time and effort of the user.

When it is not determined that replacement time is near in step S1260, or the processing of step S1270 is performed, the processor 20 terminates the document reading processing. In this regard, in step S105, when it is determined to be in a replacement necessary state, the processor 20 informs the user of the necessity of replacement of a document transport roller via the display of the UI section 70 (step S1400). Specifically, for example, the processor 20 displays a replacement procedure on the display. It is possible for the user to replace a document transport roller while confirming the replacement procedure.

As described above, with the present embodiment, it is possible to increase the possibility of shortening the down time of the image reading device 10 compared with the configuration in which a replacement transport roller is arranged when replacement actually becomes necessary. Also, to date, a method of encouraging replacement of a roller is known when a predetermined number of sheets of documents have been read. However, the progress state of abrasion of a document transport roller differs depending on the use state (what kinds of documents were often read, and the like) of the image reading device. Accordingly, there is a possibility that a usable roller is replaced earlier. With the present embodiment, it is possible to suppress a cost increase in replacement of a document transport roller.

2. Second Embodiment

The abnormalities of the image reading device may occur by various kinds of causes, for example, dirt of the sensor 41, deterioration of the sensor 41, deterioration of the light source 42, dirt of a document transport roller, and the like in addition to abrasion of the document transport roller. In a second embodiment, estimation is made on a handling method (device abnormality information) in accordance with an abnormal place and abnormality contents that have currently occurred on the reading device based on the image data representing a document.

Figure 10:
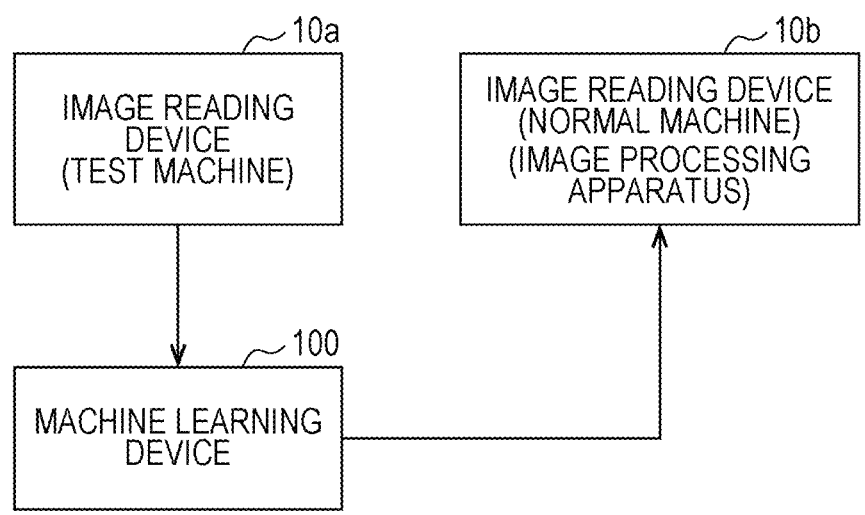
FIG. 10 is a block diagram illustrating the configuration of an image reading device and a machine learning device according to a second embodiment.

FIG. 10 is a diagram illustrating the example of the configuration of an image reading device and a machine learning device according to the second embodiment. In the present embodiment, it is assumed that there are an image reading device (also referred to a test machine 10*a*) that operates for analyzing an abnormal place and abnormality contents, a machine learning device 100 that stores teaching data associating a handling method for abnormality in the test machine 10*a* with image data and performs machine learning based on the teaching data to generate a machine-learned model, and an image reading device (also referred to as a normal machine 10*b*) that estimates a handling method of abnormality that occurred in the device using the machine-learned model. It is assumed that a plurality of test machines 10*a* and a plurality of normal machines 10*b* are provided.

The type of the test machine 10*a* is the same as that of the normal machine 10*b*. Also, the test machine 10*a* and the normal machine 10*b* have the same configuration as that of the image reading device 10 illustrated in FIG. 1. Each test machine 10*a* repeatedly performs reading of various kinds of documents in various use states. In the test machine 10*a*, when a document is set on the document tray 60*a*, and reading is started, the processor 20 of the test machine 10*a* transports the document, generates reading image data, and transmits the generated image data to the machine learning device 100. When the controller 120 of the machine learning device 100 receives image data, the controller 120 stores the image data in association with a handling method. Specifically, the controller 120 of the machine learning device 100 according to the present embodiment is capable of executing a diagnosis program for analyzing the image data received from the test machine 10*a* and diagnosing presence or absence of abnormality, an abnormal place, and abnormality contents. The controller 120 identifies presence or absence of abnormality, an abnormal place, and abnormality contents in the test machine 10*a* using the function of the diagnosis program, generates teaching data associating a handling method of the abnormality with the image data, and stores them in the storage medium 130.

For example, when a stripe extending in the sub scanning direction appears on the image data generated by reading a document, various major factors are considered to be reasons for causing the stripe. For example, when minute powder dust has adhered to a sensor, a stripe extending in the sub scanning direction may appear in the image data representing the document. When it is possible to remove powder dust by cleaning the sensor, the stripe may be eliminated. Also, for example, when it is not possible to eliminate a stripe even by cleaning the sensor, it is thought that a part of photoelectric conversion elements of the sensor has broken down. In this case, a stripe extending in the sub scanning direction may also appear in the image data representing the document. In this case, a stripe may be eliminated by correcting pixel values in the stripe portion (pixels corresponding to a deteriorated element) based on the output of the elements that has not deteriorated and located around the element that has deteriorated in the main scanning direction. Also, for example, when the number of stripes is equal to or higher than a predetermined reference, or the like, it is possible to eliminate the stripe by replacing the sensor.

Also, for example, a stripe (low luminance part) extending in the sub scanning direction may appear at a specific position in the main scanning direction in the image data due to deterioration of a light source. In this case, by performing calibration in the image reading device, it may be possible to suppress lower image quality (partial low luminance) due to deterioration of the light source. Although calibration is performed, when it is not possible to eliminate partial lowering of luminance, it may be possible to solve the problem by replacing the light source.

Figure 11:
FIG. 11 is a diagram illustrating an example of an image generated by reading a document.
Figure 12:
FIG. 12 is a diagram illustrating an example of an image generated by reading a document.

Also, when toner, ink, or the like of a document has adhered to a document transport roller, the surface of the roller becomes dirty. When a document is transported by a dirty roller, and dirt of the roller adheres to the document, as illustrated by an image I4 in FIG. 12, roller marks (stripes extending in the sub scanning direction) appear in the image data representing the document (an image I3 in FIG. 11 is a reading image when the roller is not dirty). A roller mark appears in the image data at a contact position with the roller in the main scanning direction as a parallel mark to the sub scanning direction. When a roller is dirty, it is possible to eliminate the state of a roller mark appearing in the image data by cleaning the roller.

Also, as described in the first embodiment, image data produced by reading a document is generated to be extended in the sub scanning direction due to abrasion of a document transport roller or temporary slip caused by paper powder, and the like. The characteristic that appears on image data caused by a smaller outer diameter of a roller due to abrasion may differ from the characteristic that appears on image data caused by temporary slip. In the case of temporary slip, for example, it may be possible to eliminate extension due to slip by cleaning the roller. When it is understood in advance that a roller is worn out, for example, in the case in which the outer diameter (or may be outer circumference) is greater than a first threshold value, it is possible to continue using the roller, whereas in the case in which the outer diameter is less than a second threshold value (first threshold value>second threshold value), it becomes difficult for a roller to transport a document due to sipping, and replacement is carried out. When the outer diameter of a roller is less than or equal to the first threshold value and equal to or greater than the second threshold value, it is possible to replace a roller while suppressing unnecessary replacement of a roller at high frequency and before it becomes difficult to transport the document.

By executing a diagnosis program, when the controller 120 of the machine learning device 100 detects, for example, a stripe that extends in the sub scanning direction in the image data generated by reading, the controller 120 notifies an inspection worker of the contents of an inspection work on the test machine 10a. Specifically, for example, the machine learning device 100 transmits the contents of the inspection work to the test machine 10a, the processor 20 of the test machine 10a notifies the inspection worker via the UI section 70 of the test machine 10a. When the inspection worker performs the inspection work in accordance with the notified contents and inputs an end of the work and a result thereof via the UI section 70, the machine learning device 100 obtains the end of the inspection work in the test machine 10a.

The inspection work is, for example, "sensor cleaning", "calibration (cause to read a calibration sheet and start calibration processing)", "roller cleaning", or the like. The controller 120 causes the inspection worker to perform these kinds of inspection work, for example, one by one in order according to the characteristic of the image data. When the stripe is eliminated in the image data of the document read after the inspection work, the controller 120 associates the image data before performing the inspection work and the image data after performing the inspection work, and stores them as one of the teaching data.

When a stripe is not eliminated as a result of performing these kinds of inspection work, any one of "image correction", "sensor replacement", "light source replacement", and "the other actions" is selected as a handling method for eliminating the stripe based on the stripe mode (position, the number, width, and the like) included in the image data. The selected handling method is associated with the image data (image data having a stripe), and these are stored as one of the teaching data.

Also, by executing a diagnosis program, when the controller 120 of the machine learning device 100 detects, for example, that the image data generated by document reading is extended in the sub-scanning direction (for example, the method of the processing of S110 to S135 in FIG. 5 may be used), the controller 120 encourages the inspection worker to perform "roller cleaning". When the extending of the image data of the document read after roller cleaning is eliminated, the controller 120 associates the image data (extended image data) before roller cleaning with "roller cleaning" and stores them as one of the teaching data.

Also, the inspection work includes measurement of the outer diameter (may be an outer circumference) of the document transport roller. The controller 120 prompts an inspection worker to measure the outer diameter of the document transport roller in the test machine 10a periodically (for example, once in reading ten thousand sheets of documents, or the like) and obtains a measurement result. When the measurement result is higher than a first threshold value, and in the case in which there are no abnormalities, such as a stripe, and the like in the document read immediately before, the controller 120 associates the image data read immediately before the measurement with "currently no action is necessary" and stores them as one of the teaching data. When the measurement result is less than or equal to the first threshold value and equal to or higher than a second threshold value, the controller 120 associates the image data of the document read immediately before the measurement with "roller replacement" and stores them as one of the teaching data. In this regard, the above-described threshold value may be determined for each roller of the document transport rollers and may be obtained by measuring the outer diameter of each roller, or for a roller that impacts most on the lower image quality (extending) due to abrasion and may be obtained by measuring the outer diameter of the roller.

Figure 13:
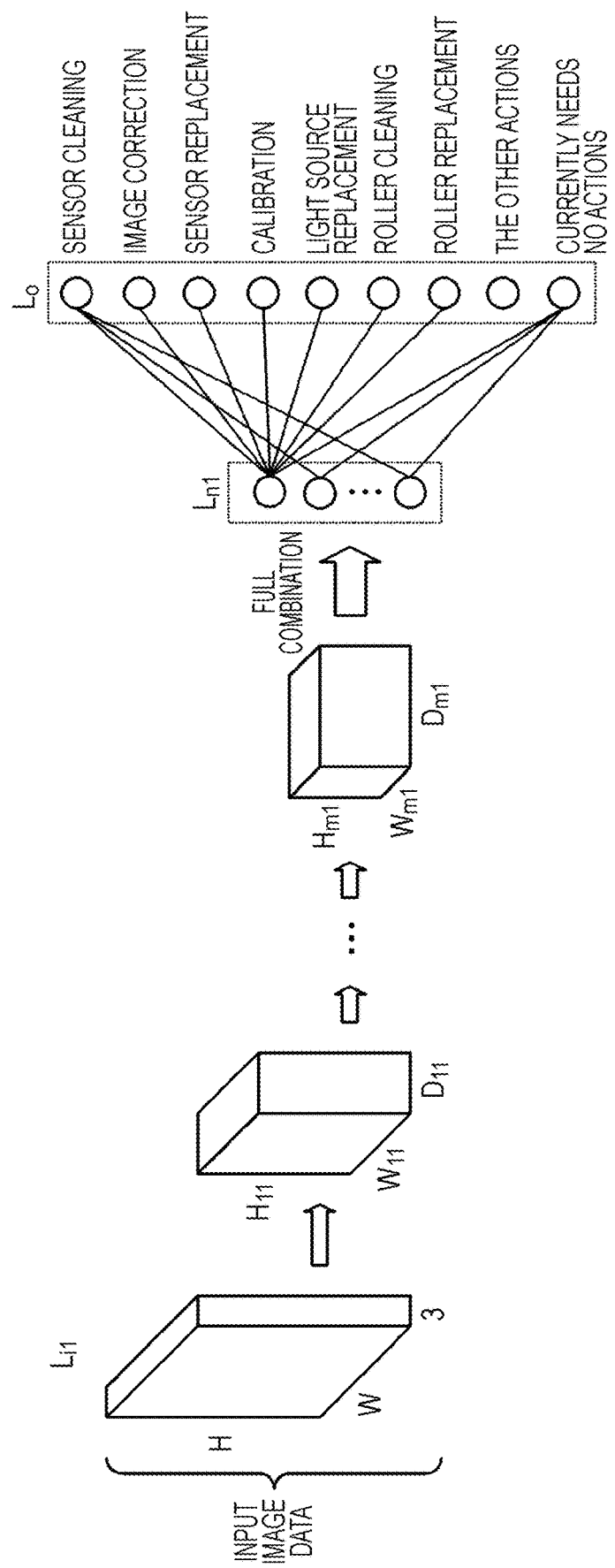
FIG. 13 is a diagram illustrating input and output of a machine learning model according to the second embodiment.

FIG. 13 is a diagram illustrating an example of input and output of a model according to the second embodiment. In the model illustrated in FIG. 13, the image data representing a document is input, and a handling method when the input image data is read is output. Each node of an output layer $L_o$ is associated with a corresponding one of the handling methods. Specifically, each node is associated with a corresponding one of the handling methods described above. That is to say, each of "sensor cleaning", "image correction", "sensor replacement", "calibration", "light source replacement", "roller cleaning", "roller replacement", "the other actions", and "currently needs no actions" is associated. The controller 120 of the machine learning device 100 performs machine learning processing using the teaching data stored in the storage medium 130 to generate a machine-learned model. The controller 120 of the machine learning device 100 transmits the generated machine-learned model to the normal machine 10b (refer to FIG. 10).

Figure 14:
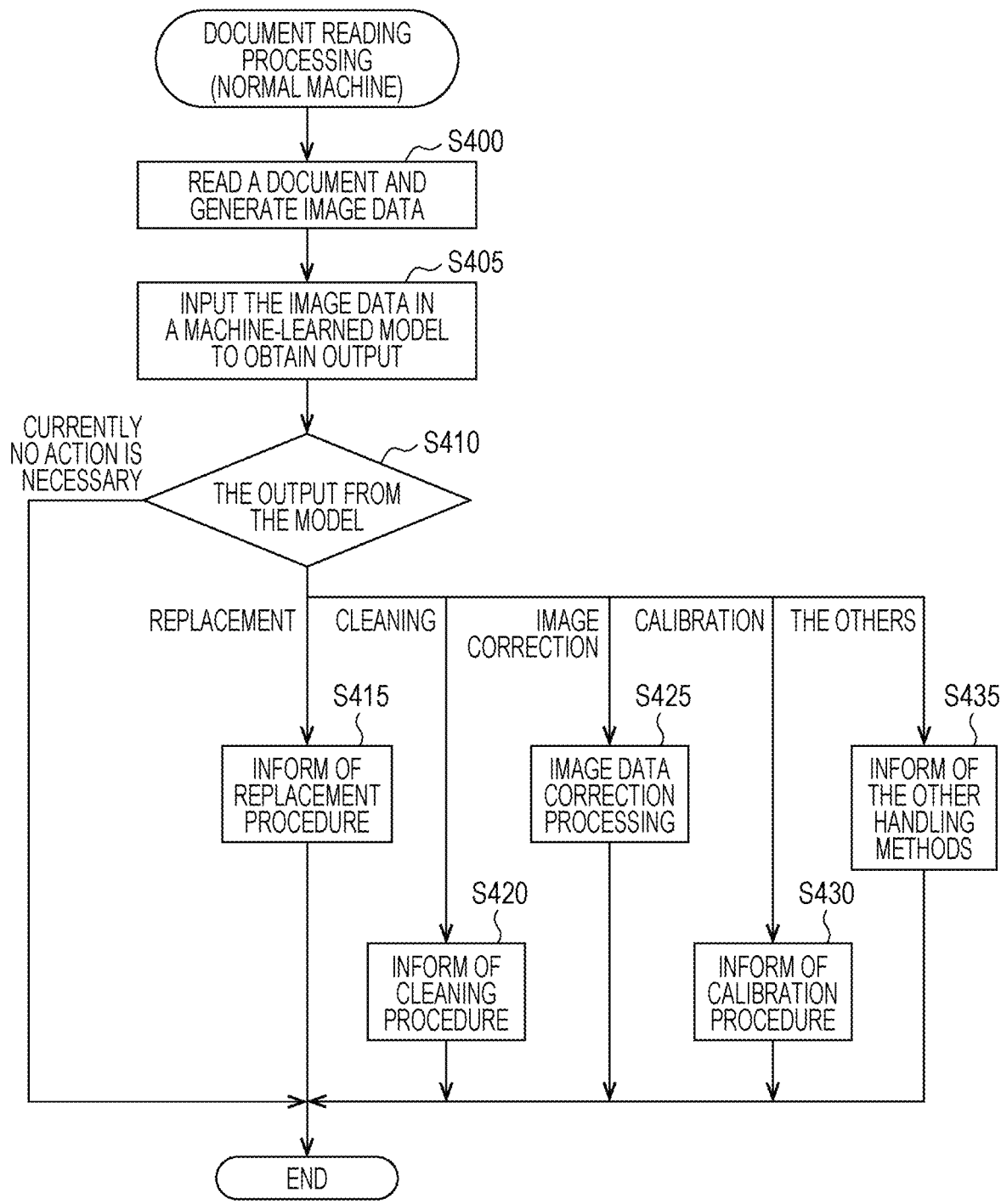
FIG. 14 is a flowchart of document reading processing according to the second embodiment.

When the processor 20 of the normal machine 10b obtains a machine-learned model from the machine learning device 100, the processor 20 stores the machine-learned model in the nonvolatile memory 30. FIG. 14 is a flowchart of the document reading processing performed by the processor 20 of the normal machine 10b. When a document is set on the document tray 60a, and reading is started, the processor 20 reads the document and generates image data representing the document (step S400). Next, the processor 20 inputs image data representing the document in the machine-learned model to obtain output (step S405).

Next, the processor 20 determines the output from the model (step S410) and performs the following each processing (S415 to S435) in accordance with the output from the model. When the output from the model is any one of "sensor replacement", "light source replacement", and "roller replacement", the processor 20 informs the user of the replacement procedure of a sensor, a light source, or a roller via the UI section 70 (step S415). When the output from the model is either "sensor cleaning" or "roller cleaning", the processor 20 informs the user of the cleaning procedure of a sensor or a roller via the UI section 70 (step S420).

When the output from the model is "image correction", the processor 20 performs correction processing of the image data generated in step S400 (step S425). Specifically, for example, the processor 20 corrects the grayscale values of the pixels in the stripe portion based on the grayscale values of the pixels adjacent to the main scanning direction and determines the corrected image data as a reading result.

When the output from the model is "calibration", the processor 20 informs the user of the calibration procedure via the UI section 70 (step S430). When the output from the model is "the other actions", the processor 20 informs the user of the other handling methods via the UI section 70 (step S435). The other actions may be assumed to be, for example, replacement of the other part, such as a motor that drives a document transport roller, and the like, a dispatch request of a serviceman, or the like. In this regard, when the output from the model is "currently needs no actions", the processor 20 does not perform the processing corresponding to a handling method and terminates the document reading processing.

In this regard, detection of the state of each part (roller, sensor, light source, and the like) of the image reading device at the time of reading a document may be performed by an inspection robot instead of an inspection worker. Also, the inspection method is not limited to the above-described contents and procedure. The algorithm for identifying an abnormal place and abnormality contents are also not limited to the contents described above.

3. The Other Embodiments

The embodiments described above are examples of carrying out the present disclosure. It is possible to employ the other various embodiments as long as an image reading device stores a machine-learned model produced by performing machine learning using teaching data associating image data generated by reading a document with device abnormality information concerning the abnormality of the image reading device, and when the image reading device reads a document, device abnormality information is obtained based on the generated image data and the machine-learned model. For example, the image processing apparatus may be a complex machine having a FAX communication function and a print function in addition to the image reading function. Also, in the embodiments described above, the example in which a document is read by ADF is given. However, it is possible to apply the present disclosure to the case in which a document mounted on a document table is read. For example, a handling method may be estimated in accordance with dirt and scratches of a document table, dirt and deterioration of a sensor, deterioration of a light source, deterioration of a sub scanning device that moves a carriage in the sub-scanning direction, and the like.

Device abnormality information is information on the abnormality of an image reading device. Device abnormality information may include an abnormal place of the image reading device. That is to say, a place (part) where abnormality occurs in the image reading device may be estimated and output based on the image data representing a read document, or the like.

In the first embodiment, the time when it becomes necessary to replace a document transport roller next is expressed by a length of time. However, a scale other than time may be used. For example, a user may be informed that "it is expected that replacement of a roller becomes necessary when one-sided reading of A4 documents of X sheets more are read, so that do you order a replacement necessary roller?".

In this regard, estimation of the replacement time of a part of the image reading device is not limited to a document transport roller. For example, it is possible to apply the present disclosure to a part whose performance gradually deteriorates by use or over time.

In the second embodiment, calibration and replacement of a light source are given as handling methods of abnormalities related to a light source. However, cleaning of a light source may be included in the handling methods. For example, in the case in which a document is irradiated by an LED and a light guide plate, when dust adheres to a part of the light guide plate, the luminance of that part deteriorates, and thus an image having a luminance low part extending in the sub-scanning direction may appear. When the partial luminance deterioration is resolved by cleaning the light guide plate, the image data including a luminance low part before the cleaning and the cleaning of the light guide plate may be associated as teaching data, and the teaching data may be stored.

The machine learning may be performed by various methods. That is to say, learning ought to be performed by building a model that receives input of the image data generated by reading a document by a document reading device and outputs device abnormality information on the abnormality of an image reading device, and that minimizes the difference between the output by the model and the device abnormality information of teaching data. Accordingly, for example, when machine learning by a neural network is performed, machine learning ought to be performed by suitably selecting various elements, such as the number of layers included in a model, the type of activation function, the type of loss function, the type of gradient descent method, the type of optimization algorithm of the gradient descent method, the existence of minibatch learning and the number of batches, learning rate, initial values, the existence and the type of overtraining method, the existence of convolutional layer, the filter size in the convolution operation, the type of filter, the type of padding and stride, the existence and the type of pooling layer, the existence of fully-combined layer, the existence of recursive structure, and the like. Of course, the other machine learning, for example, learning by a support vector machine, clustering, reinforcement learning, and the like may be performed. Further, machine learning that automatically optimizes the structure of a model (for example, the number layers, the number of nodes for each layer, and the like) may be performed. Further, the learning may be performed dividedly in a plurality of stages.

Further, it is possible to apply the method of obtaining device abnormality information as a program or a method. As described in the present disclosure, a machine-learned model is stored by performing machine learning using teaching data associating image data generated by reading a document by an image reading device with device abnormality information on the abnormality of an image reading device, and when the image reading device reads a document, the device abnormality information is obtained based on the generated image data and the machine-learned model. Also, the above-described system, program, and method may be realized in various modes, for example, as a single device, or may be used as a part of a system including a plurality of devices. Also, it is possible to suitably realize a part of the system as software, a part of the system as hardware, and the like. Further, the present disclosure is realized as a recording medium storing a program that controls the system. Of course, the recording medium of the program may be a magnetic recording medium, a semiconductor memory, or may be considered to be any recording medium that will be produced by future development exactly in the same manner.

What is claimed is:

1. An image processing apparatus comprising:
a memory configured to store a machine-learned model produced by performing machine learning using teaching data associating image data generated by reading a document by an image reading device with device abnormality information on abnormality of the image reading device; and
when the image reading device reads a document, a processor configured to determine whether a device abnormality associated with the image reading device is present based on generated image data and the machine-learned model.

2. The image processing apparatus according to claim 1, wherein
in the teaching data, at least one of use history of the image reading device, reading resolution of a document, and a type of document medium is associated with the device abnormality information.

3. The image processing apparatus according to claim 2, wherein
the use history includes at least one of replacement history of a document transport roller, history of document transport error, and transition information of a length variation value representing a difference between a number of pixels of a document in a sub scanning direction corresponding to a reading resolution and a number of pixels of generated image data in the sub scanning direction, and
the device abnormality information includes time when replacement of a document transport roller becomes necessary.

4. The image processing apparatus according to claim 3, wherein
when the device abnormality information is information on replacement of a document transport roller, the processor informs to encourage ordering a document transport roller or automatically places an order.

5. The image processing apparatus according to claim 1, wherein
the device abnormality information includes a handling method for abnormality, and
the handling method includes at least one of replacement of a document transport roller, cleaning of a document transport roller, and image correction of the image data generated by the reading.

6. The image processing apparatus according to claim 1, wherein
the device abnormality information includes an abnormal place of the image reading device.

7. A machine learning device comprising:
a controller configured to:
obtain teaching data associating image data generated by reading a document by an image reading device with device abnormality information on abnormality of the image reading device, and
perform machine learning on a model configured to input the image data and output the device abnormality information based on the teaching data, the device abnormality information indicating whether a device abnormality associated with the image reading device is present.

8. An image processing method comprising:
storing a machine-learned model obtained by performing machine learning using teaching data associating image data generated by reading a document by an image reading device with device abnormality information on abnormality of the image reading device, and
when the image reading device reads a document, determine whether a device abnormality associated with the image reading device is present based on generated image data and the machine-learned model.

* * * * *